United States Patent
Carpignano

(10) Patent No.: US 10,823,306 B2
(45) Date of Patent: Nov. 3, 2020

(54) PNEUMATIC VALVE

(71) Applicant: MICROTECNICA S.r.l., Turin (IT)

(72) Inventor: Claudio Carpignano, Piobesi Torinese (IT)

(73) Assignee: MICROTECNICA S.R.L., Turin (IT)

(*) Notice: Subject to any disclaimer, the term of this patent is extended or adjusted under 35 U.S.C. 154(b) by 48 days.

(21) Appl. No.: 15/834,334

(22) Filed: Dec. 7, 2017

(65) Prior Publication Data

US 2018/0163892 A1   Jun. 14, 2018

(30) Foreign Application Priority Data

Dec. 8, 2016 (EP) .................................... 16202872

(51) Int. Cl.
| | |
|---|---|
| *F16K 31/122* | (2006.01) |
| *F16K 1/12* | (2006.01) |
| *F16K 3/26* | (2006.01) |
| *F16K 27/04* | (2006.01) |
| *B33Y 80/00* | (2015.01) |

(52) U.S. Cl.
CPC ............ *F16K 31/122* (2013.01); *B33Y 80/00* (2014.12); *F16K 1/126* (2013.01); *F16K 3/265* (2013.01); *F16K 27/041* (2013.01); *F16K 31/1223* (2013.01)

(58) Field of Classification Search
CPC ......... Y10T 137/3367; Y10T 137/3421; Y10T 137/3476; Y10T 137/353; F16K 31/122; F16K 31/1223; F16K 31/1226; F16K 1/12; F16K 1/126; F16K 27/041; F16K 3/262; F16K 3/265; F16K 3/26
USPC ...................... 137/219–222, 625.38; 251/325
See application file for complete search history.

(56) References Cited

U.S. PATENT DOCUMENTS

| | | | | |
|---|---|---|---|---|
| 878,183 | A * | 2/1908 | Brauner | .................... F16K 3/26 |
| | | | | 137/625.38 |
| 1,524,400 | A * | 1/1925 | Larner | .................... F16K 1/126 |
| | | | | 137/222 |
| 3,771,562 | A | 11/1973 | Curran | |
| 3,778,022 | A | 12/1973 | Yauneridge | |
| 3,901,266 | A * | 8/1975 | Guy | ..................... G05D 7/0153 |
| | | | | 137/219 |
| 6,213,144 | B1 | 4/2001 | Moore | |
| 2003/0196698 | A1* | 10/2003 | Lin | ........................... F16K 1/12 |
| | | | | 137/219 |
| 2007/0107784 | A1 | 5/2007 | Hoffman et al. | |
| 2016/0169411 | A1 | 6/2016 | Fahrner et al. | |
| 2016/0200442 | A1 | 7/2016 | Jones | |

FOREIGN PATENT DOCUMENTS

| | | | | |
|---|---|---|---|---|
| DE | 2824038 A1 * | 1/1979 | ............. | F16K 1/126 |
| DE | 102014212786 A1 | 1/2016 | | |
| FR | 3018892 A1 | 9/2015 | | |

OTHER PUBLICATIONS

Machine Translation of DE2824038A1 (Year: 1979).*
Extended European Search Report for International Application No. 16202872.4 dated Apr. 28, 2017, 9 pages.

* cited by examiner

*Primary Examiner* — Michael R Reid
(74) *Attorney, Agent, or Firm* — Cantor Colburn LLP

(57) ABSTRACT

A pneumatic valve is disclosed comprising: an outer housing formed from a continuous single-piece of material and defining a fluid inlet port and a fluid outlet port; a separate piston sleeve housed within the housing; and a piston slidably mounted within the piston sleeve.

12 Claims, 4 Drawing Sheets

PRIOR ART

PRIOR ART

PNEUMATIC VALVE

FOREIGN PRIORITY

This application claims priority to European Patent Application No. 16202872.4 filed Dec. 8, 2016, the entire contents of which is incorporated herein by reference.

FIELD OF THE INVENTION

The present invention relates generally to valves and in particular to valves comprising a piston member that moves between a valve open position and a valve closed position.

BACKGROUND

Axial type pneumatic valves are commonly used in aerospace applications, for example, in engine/nacelle anti-icing systems, engine bleed control, etc. Such valves comprise an external housing that houses a number of internal parts, including a piston, poppet, seals and springs etc. The housing is formed from multiple component parts that are conventionally formed by casting or from machined stock. The component parts are then joined together during the assembly process, e.g. using bolts or by welding, and the internal parts are incorporated in the housing.

However, the construction of such conventional valves imposes constraints on the geometries of the housing components, which in turn limits the configuration and performance the valve. For example, the internal surface of the housing acts as a cylinder in which the piston moves and this requires sophisticated and accurate surface finishing processes that are often not suitable to the housing geometry. Consequently, compromises are made in the design and manufacturing of the valves so as to accommodate the various requirements, which leads to non-optimised performance of the valves and complex manufacturing methods.

SUMMARY

Embodiments provide a pneumatic valve comprising: an outer housing formed from a continuous single-piece of material and defining a fluid inlet port and a fluid outlet port; a separate piston sleeve housed within the housing; and a piston slidably mounted within the piston sleeve.

The housing may be a monobloc housing.

The continuous single-piece of material may surround the whole of the piston sleeve and the piston.

The continuous single-piece of material may form substantially the entirety of the exterior surfaces of the valve.

The housing may be formed by an additive manufacturing or 3D printing technique. For example, the housing may be formed by Direct Laser Metal Sintering or Electron Beam Metal Sintering. Alternatively, the housing may be formed by other techniques, such as casting.

The valve may be an axial type valve, wherein the axes through the inlet and outlet ports are parallel and/or coaxial.

The piston may be slidably mounted in the piston sleeve so as to be movable to an open position in which the inlet port and outlet port are in fluid communication, and a closed position in which the piston blocks fluid communication between the inlet and outlet ports.

The piston may be a tubular member having a conduit therein that is in fluid communication with the outlet port, and one or more apertures in a circumferential wall of the piston for allowing fluid communication with the inlet port when the piston is in the open position.

When the piston is in the closed position, the one or more apertures in the wall of the piston are located such that fluid communication between the inlet and exit ports is blocked.

The piston sleeve may have one or more apertures through its circumferential wall for allowing fluid communication between the inlet and outlet ports, via the one or more apertures in the piston, when the piston is arranged in the open position.

When the piston is in the closed position, the one or more apertures in the piston sleeve are not aligned with one or more apertures in the piston, thereby blocking fluid flow between the inlet and outlet ports.

The housing may define a piston chamber and the piston sleeve may be mounted against, or to, the internal surface of the housing in the piston chamber.

The piston sleeve may be a substantially tubular member, such as a substantially cylindrical member.

The piston sleeve may be rigid.

The inner surface of the piston sleeve may be a friction reducing coating or layer, or the inner surface of the piston sleeve may be a lower friction material than the housing material. Alternatively, or additionally, the inner surface of the piston sleeve may be a harder material than the housing material.

The piston may comprise a seal at each end thereof that contacts the inner surface of the piston sleeve to form a seal between the piston and sleeve that is maintained as the piston is moved within the piston sleeve.

The piston sleeve and piston may be geometrically configured to interact so as to limit the slidable movement of the piston within the sleeve between an open position and a closed position The sleeve may comprise a radial detent extending along the sleeve and the piston may comprise a radial projection that is received in the detent for limiting the slidable movement of the piston within the sleeve in a first and/or second direction (e.g. between the open position and the closed position).

Alternatively, the piston may comprise a radial detent extending along the piston and the sleeve may comprise a projection that is received in the detent.

The piston sleeve may be formed from first and second tubular portions that interconnect by having overlapping end portions, wherein the interconnecting end of the second tubular portion is recessed along a length thereof on its radially inner side, and wherein the recessed length only partially overlaps the first tubular portion so that the remainder of the recessed length forms said detent.

The interconnecting end of the first tubular portion may be recessed along a length thereof on its radially outer side, wherein this recessed length overlaps the recessed length of the second tubular member.

The piston sleeve and/or first tubular member and/or second tubular member and/or piston may be sized and configured so as to be axially insertable into the housing through the exit port.

An inner surface of the housing may be configured to prevent axial movement of the piston sleeve in a first direction and/or the valve may comprise one or more securing member for preventing axial movement of the piston sleeve relative to the housing in a second opposite direction and out of the exit port. For example, the securing member may be a ferrule or other member that is attachable to the housing to prevent the sleeve moving out of the exit port.

The one or more securing member may be engagable and disengageable with the housing, e.g. repeatedly engagable and disengageable with the housing. This allows the piston and/or piston sleeve to be removed from the housing, e.g. to replace or repair these elements.

The piston sleeve may engage the housing and/or securing member with one or more mating profiles that are configured so that the one or more mating profiles ensure fluid tightness between the piston sleeve and the housing and/or securing member so as to prevent fluids, such as gases, from passing around the outside of the piston sleeve.

The housing formed from the continuous single-piece of material may further comprise one or more conduits through a wall thereof for connecting the inlet and/or outlet port to pressure control devices and/or to other pressure fittings. Accordingly, in addition to the main valve conduit extending between the inlet and outlet ports, the housing further defines at least one further port and at least one further conduit extending between the at least one further port and the main conduit. The at least one further conduit may be used to convey pressure from the inlet port and/or outlet port to a pressure control device that controls the position of the piston. The pressure control device may comprise, for example, a solenoid valve or a pressure regulating valve etc.

Embodiments also provide a method of manufacturing the valve described herein, comprising:

a) forming or providing said housing;
b) inserting said piston into at least a portion of said piston sleeve; and then
c) inserting the combination of the piston and at least a portion of said piston sleeve together into the housing through the exit port; or
d) forming or providing said housing;
e) inserting at least a portion of said piston sleeve into the housing through the exit port; and then f) inserting the piston through the exit port and into the piston sleeve.

The step of forming said housing may comprise forming said housing using an additive manufacturing or 3D printing technique. For example, the housing may be formed by Direct Laser Metal Sintering or Electron Beam Metal Sintering. Alternatively, the housing may be formed by other techniques, such as casting.

Step b) of the above method may comprise inserting one end of the piston into a first portion of the piston sleeve and another end of the piston into a second portion of the piston sleeve, and step c) may comprise inserting the combination of the piston and both portions of said piston sleeve together into the housing through the exit port. Alternatively, steps e) and f) of the above method may comprise: inserting a first portion of the piston sleeve into the housing through the exit port; inserting the piston through the exit port and into the first portion of the piston sleeve; and inserting a second portion of the piston sleeve into the housing through the exit port so as to surround the piston.

The method may comprise connecting one or more securing member to the housing to prevent axial movement of the piston sleeve relative to the housing.

The piston sleeve may engage the housing and/or securing member with one or more mating profiles that are configured so that the one or more mating profiles ensure fluid tightness between the piston sleeve and the housing and/or securing member so as to prevent fluids, such as gases, from passing around the outside of the piston sleeve.

BRIEF DESCRIPTION OF THE DRAWINGS

Various embodiments will now be described, by way of example only, and with reference to the accompanying drawings in which.

DETAILED DESCRIPTION

Figure 1A:
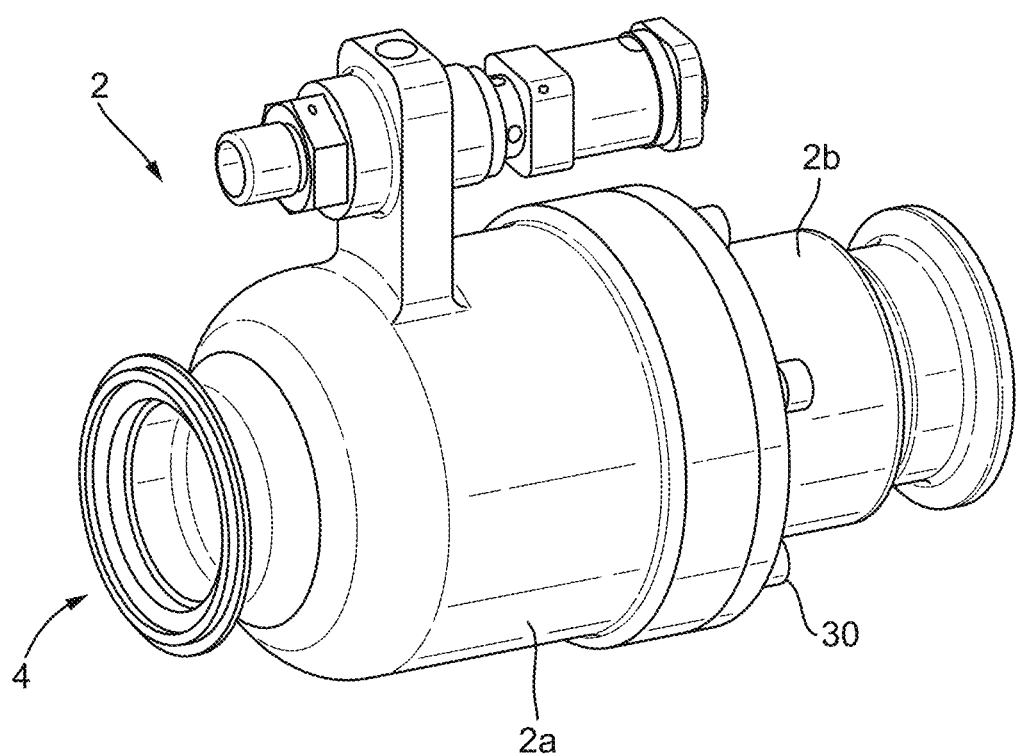
FIGS. 1A, 1B and 1C show various views of a valve according to the prior art.
Figure 1B:
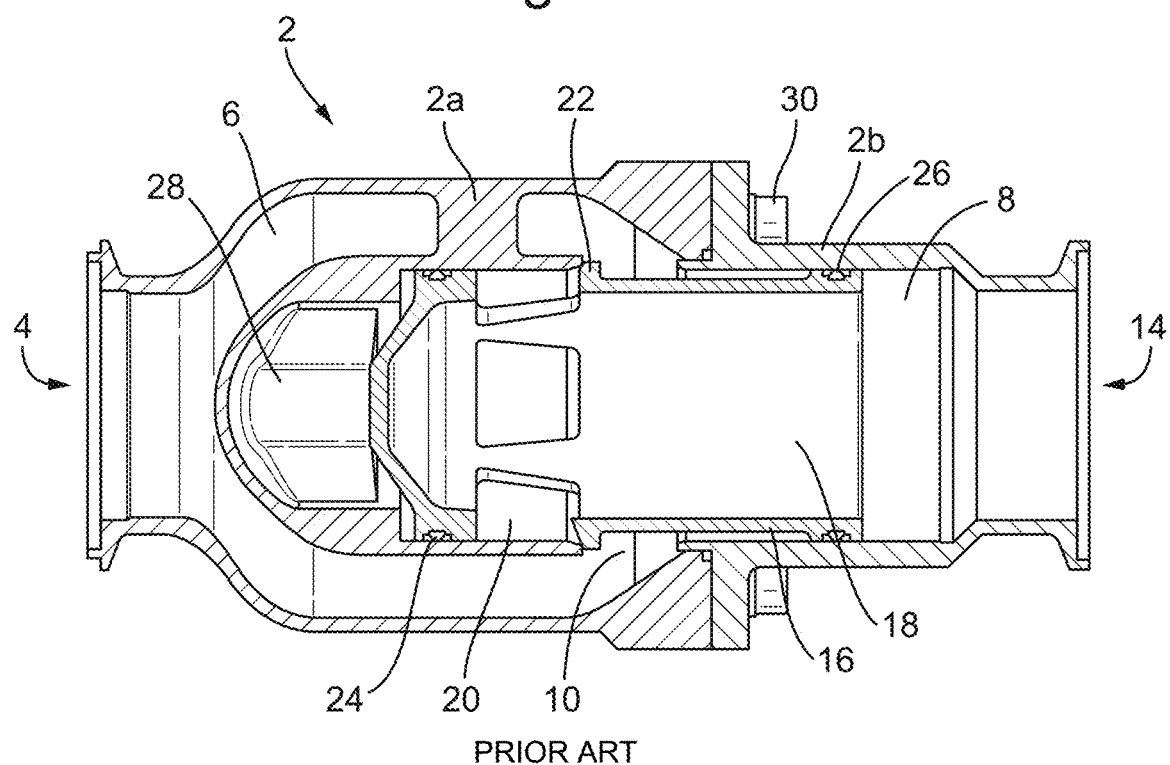
Figure 1C:
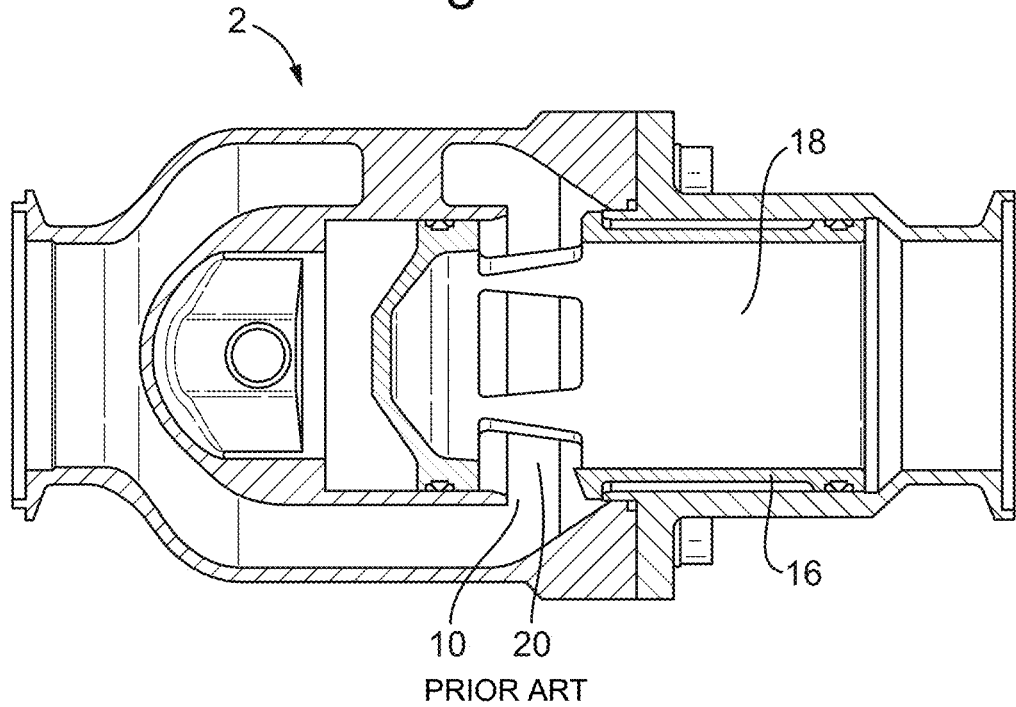

FIG. 1A shows a perspective view of a valve according to the prior art. FIGS. 1B and 1C show cross-sectional views of the valve in a closed position and an open position, respectively. The valve comprises a housing 2 formed from a first portion 2a and a second portion 2b that are secured together. The housing 2 defines an inlet port 4, an annular fluid inlet conduit 6, a piston chamber 8, an annular fluid entrance into the piston chamber 10, a valve control chamber 28, a control turret, and an exit port 14. A longitudinally extended, tubular piston 16 having an axial conduit 18 therethrough is arranged in the piston chamber 8. The piston 16 has apertures 20 in its circumferential wall that allow fluid communication between the outside of the piston 16 and the conduit 18 therein. The piston 16 also a radial projection 22 extending outwardly from the circumferential surface and located on a downstream side of the apertures 20. The piston 16 is arranged in the piston chamber 8 so as to be movable along an axis that is coaxial with the axis through the inlet and exit ports 4,14. A first piston seal 24 is arranged on a first end of the piston 16, upstream of the apertures 20, so as to provide a fluid seal between the first end of the piston 16 and housing 2. A second piston seal 26 is arranged on a second end of the piston 16, downstream of the radial projection 22, so as to provide a fluid seal between the second end of the piston and the housing 2.

The housing 2 and the head of the piston 16 define the valve control chamber 28, which can be used in controlling the axial position of the piston 16. More specifically, the control turret comprises a control conduit for fluidly connecting one or more control devices to the chamber 28. The control device(s) may then be used to vary the pressure of the fluid in the control chamber 28, so as to change the position of the piston 16. In the example shown, the control turret comprises a control device in the form of a pressure limiting valve connected to the control conduit, and a fitting for connecting another of said control devices to the control conduit. The control device may, for example, comprise a solenoid valve, a pressure regulating valve etc. Each control device may form part of the valve 2 or may be connectable thereto.

The valve 2 may be moved between the closed position shown in FIG. 1B and the open position shown in FIG. 1C depending on the pressure differential across the piston head, i.e. the pressure differential between the valve control chamber 28 and the conduit 18 of the piston 16. If the pressure differential is such that the pressure in the valve control chamber 28 is lower than the pressure inside the piston 16, then the piston 16 moves to the closed position shown in FIG. 1B. However, if the pressure differential is such that the pressure in the valve control chamber 28 is higher than the pressure inside the piston 16, then the piston 16 moves to the open position shown in FIG. 1C. These events may occur by selectively decreasing or increasing the pressure in the valve control chamber 28, i.e. by releasing or injecting a fluid into the valve control chamber 28 through control conduit 5.

The operation of the valve will now be described in the two modes. Fluid is received into the inlet port 4 of the valve and passes through the annular inlet conduit 6 towards the piston chamber 8. When the pressure differential across the piston head is such that the pressure in the valve control chamber 28 is lower than the pressure in the piston conduit 18, the piston 16 moves in the upstream direction until the radial projection 22 on the circumferential surface of the piston 16 abuts against the upstream edge of the annular fluid entrance 10 into the piston chamber 8. The piston 16 therefore moves to the closed position shown in FIG. 1B. In this position, the apertures 20 through the piston 16 are not aligned with the annular fluid entrance 10 to the piston chamber 8, but rather the solid portion of the piston 16 is aligned with the annular fluid entrance 10. Also, as the radial projection 22 abuts against the upstream edge of the annular fluid entrance 10 into the piston chamber 8, fluid is prevented from passing in the upstream direction between the piston 16 and the housing 2. The piston seal 26 on the downstream end of the piston 16 prevents the fluid from passing downstream of the piston 16 between the piston 16 and the housing 2. As such, the fluid is prevented from passing between the inlet port 4 and the outlet port 14 and so is prevented from exiting the valve.

When the pressure differential across the piston head is such that the pressure in the valve control chamber 28 is higher than the pressure in the piston conduit 18, the piston 16 moves in the downstream direction until the pressure across the piston head equalises (or the radial projection 22 on the circumferential surface of the piston 16 abuts against the downstream edge of the annular fluid entrance 10 into the piston chamber 8). The apertures 20 through the piston 16 are then aligned with the annular fluid entrance 10 into the piston chamber 8 and as such the fluid enters into the piston 16 and passes along the conduit 18 therein and out of the exit port 14. Fluids are prevented from passing between the valve control chamber 28 and the piston chamber 8 by the piston seal 24 on the upstream end of the piston 16.

In order to assemble the valve prior to use, the first end of the piston 16 is inserted into the first portion 2a of the housing 2 and the second portion of the housing 2b is then arranged over the second end of the piston 16. The first and second portions of the housing 2a, 2b are then secured together, e.g. by bolts 30.

This construction of valve imposes constraints on the geometries of the housing components, which in turn limits the configuration and performance the valve. For example, the internal surface of the housing 2 acts as a cylinder in which the piston moves and so requires sophisticated and accurate surface finishing processes that are often not suitable to the housing geometry. Consequently, compromises must be made in the design and manufacturing of such valves so as to accommodate the various requirements, which may lead to non-optimised performance of the valves and complex manufacturing methods.

Figure 2A:
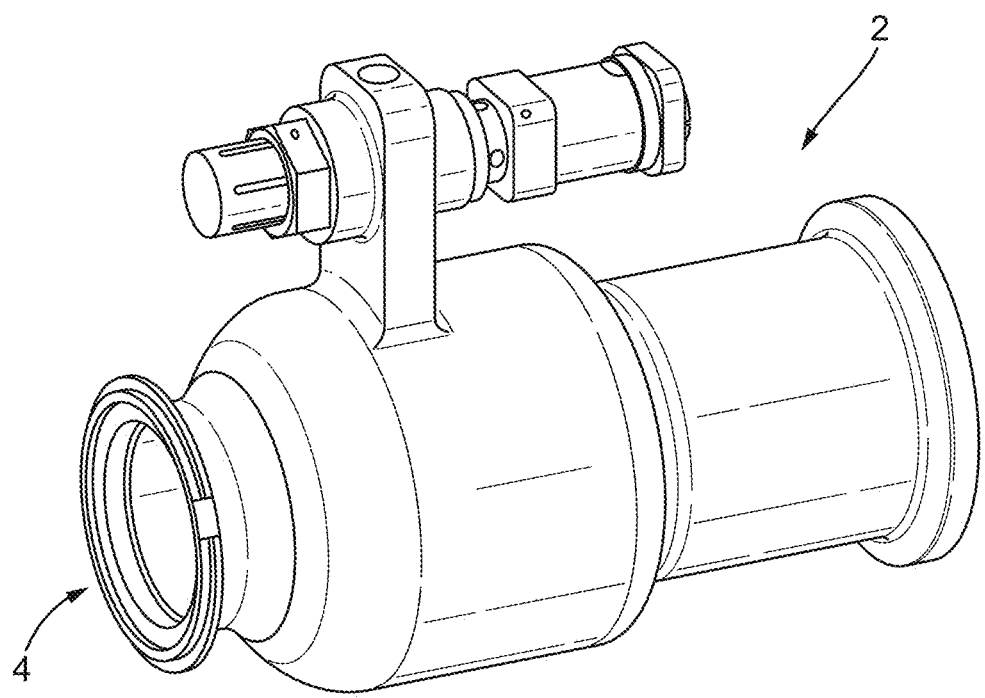
FIGS. 2A and 2B show perspective and cross-sectional views of a valve according to a first embodiment of the present invention.
Figure 2B:
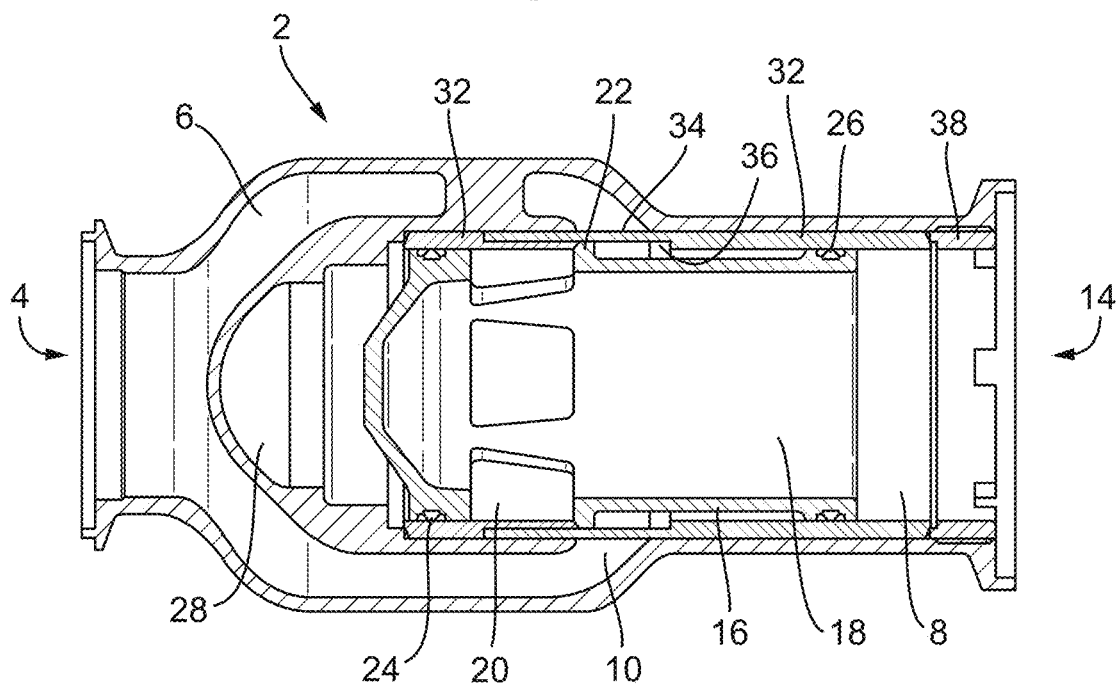

FIG. 2A shows a perspective view of a valve according an embodiment of the present invention. FIG. 2B shows a cross-sectional view of the valve of FIG. 2A, when in a closed position. The valve is similar to that shown and described in FIGS. 1A-1C, except that the housing 2 is formed from a single piece of continuous material that surrounds the piston 16 (rather than first and second housing portions that are secured together around the piston), and a piston sleeve 32 is arranged between the housing 2 and the piston 16. The housing 2 may be formed by an additive manufacturing or 3D printing technique such as Direct Laser Metal Sintering or Electron Beam Metal Sintering. These techniques enable the housing 2 to be made with maximum performance-weight-cost-geometry and in a relatively simple manner. However, it is contemplated that the housing could be manufactured by other techniques, such as casting. The construction and operation of the embodiment will be described in more detail below.

The valve comprises an external housing 2 formed from a single piece of material (e.g. a monobloc housing). The housing 2 defines an inlet port 4, an annular fluid inlet conduit 6, a piston chamber 8, an annular fluid entrance 10 into the piston chamber 8, a valve control chamber 28, a control turret, and an exit port 14. A longitudinally extended, tubular piston 16 having an axial conduit 18 therethrough is arranged in the piston chamber 8. A cylindrical piston sleeve 32 is arranged around the piston 16 so as to slidably mount the piston 16 to the housing 2. The piston sleeve 32 has apertures 34 in its circumferential wall that allow fluid to pass through the piston sleeve 32. The piston 16 has apertures 20 in its circumferential wall that allow fluid communication between the outside of the piston 16 and the conduit 18 therein. The piston 16 also has one or more radial projections 22 extending outwardly from the circumferential surface and located on a downstream side of the apertures 20. The one or more radial projections 22 extend outwardly to interact with the piston sleeve 32, as will be described in more detail below.

Figure 3A:
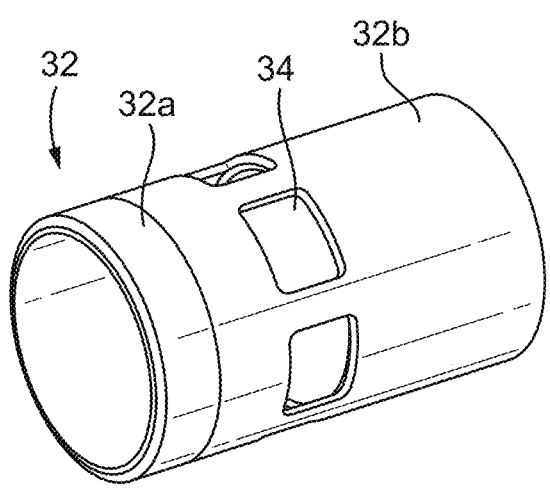
FIGS. 3A and 3B show perspective and cross-sectional views of a valve sleeve according to an embodiment of the present invention.
Figure 3B:
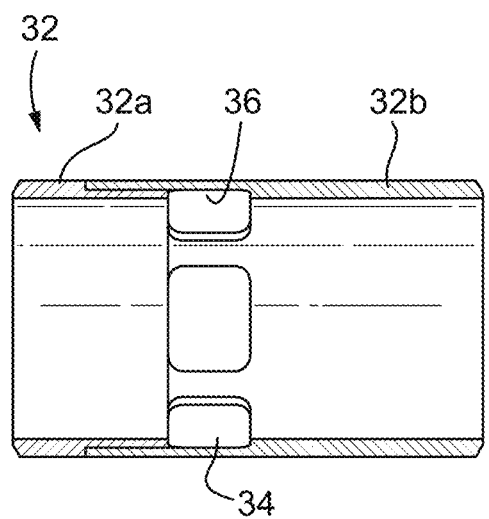

FIGS. 3A and 3B show perspective and cross-sectional views of the piston sleeve 32, respectively. The piston sleeve 32 is formed from a first tubular portion 32a and a second tubular portion 32b having the apertures 34 therethrough and that connects with the first tubular portion 32a to form the piston sleeve 32. The first tubular portion 32a has a first end region having a relatively thick wall and a second end region that is recessed on the outer surface such that the wall in the second end region is thinner. The second tubular portion 32b also has a first end region having a relatively thick wall and a second end region that is recessed on the inner surface such that the wall in the second end region is thinner. The recessed second end region of the second tubular portion 32b includes the apertures 34. The tubular portions 32a, 32b are sized and configured such that the recessed second end portion of the second tubular portion 32b can be partially slid over the recessed second end portion of the first tubular 32a, e.g. to create a tight fit, precision fit, or less desirably an interference fit. As the recessed portions of the two tubulars 32a, 32b only partially overlap when connected together, the resulting piston sleeve 32 has a circumferential detent 36 on the inner surface of the piston sleeve 32, with a first end of the detent defined by the second end of the first tubular portion 32a and a second end of the detent 36 defined by the transition between the recessed and non-recessed portion of the second tubular portion 32b.

Referring back to FIG. 2B, the one or more radial projections 22 on the piston 16 extend outwardly into the detent 36 in the piston sleeve 32, such that movement of the piston 16 within the piston sleeve 32 is limited, as described in more detail below.

The piston 16 is arranged in the piston sleeve 32 so as to be movable along an axis that is coaxial with the axis through the inlet and exit ports 4, 14. A first piston seal 24 is arranged on a first end of the piston 16, upstream of the apertures 20, so as to provide a fluid seal between the first end of the piston 16 and piston sleeve 32. A second piston seal 26 is arranged on a second end of the piston 16, downstream of the radial projection 22, so as to provide a fluid seal between the second end of the piston 16 and the piston sleeve 32.

The housing 2 and the head of the piston 16 define the valve control chamber 28, which can be used in controlling the axial position of the piston 16. More specifically, the control turret 3 comprises a control conduit 5 for fluidly connecting one or more control devices to the chamber 28. The control device(s) may then be used to vary the pressure of the fluid in the control chamber 28, so as to change the position of the piston 16. In the example shown, the control turret 3 comprises a control device in the form of a pressure limiting valve 7 connected to the control conduit 5, and a fitting 9 for connecting another of said control devices to the control conduit 5. The control device may, for example, comprise a solenoid valve, a pressure regulating valve etc. Each control device may form part of the valve 2 or may be connectable thereto.

The valve 2 may be moved between the closed position shown in FIG. 2B and an open position (not shown) depending on the pressure differential across the piston head, i.e. the pressure differential between the valve control chamber 28 and the conduit 18 of the piston 16. If the pressure differential is such that the pressure in the valve control chamber 28 is lower than the pressure inside the piston 16, then the piston 16 moves to the closed position shown in FIG. 2B. However, if the pressure differential is such that the pressure in the valve control chamber 28 is higher than the pressure inside the piston 16, then the piston 16 moves to the open position. These events may occur by selectively decreasing or increasing the pressure in the valve control chamber 28, i.e. by releasing or injecting a fluid into the valve control chamber 28 through control conduit 5.

The operation of the valve will now be described in the two modes. Fluid is received into the inlet port 4 of the valve and passes through the annular inlet conduit 6 towards the piston chamber 8. When the pressure differential across the piston head is such that the pressure in the valve control chamber 28 is lower than the pressure in the piston conduit 18, the piston 16 moves in the upstream direction. The at least one radial projection 22 on the circumferential surface of the piston 16 travels within the detent 36 of the piston sleeve 32 until it abuts against the upstream edge of the detent 36. In this position, the apertures 20 through the piston 16 are not aligned with the apertures 34 through the piston sleeve 32 or the annular fluid entrance 10 to the piston chamber 8. Rather, the solid portion of the piston 16 is aligned with the apertures 34 in the piston sleeve 32 and the annular fluid entrance 10. Also, as the at least one radial projection 22 abuts against the upstream edge of the detent 36 in the piston sleeve 32, fluid is prevented from passing in the upstream direction between the piston 16 and the piston sleeve 32. The piston seal 26 on the downstream end of the piston 16 prevents the fluid from passing downstream of the piston 16 between the piston 16 and the piston sleeve 32. As such, the fluid is prevented from passing between the inlet port 4 and the outlet port 14 and so is prevented from exiting the valve.

When the pressure differential across the piston head is such that the pressure in the valve control chamber 28 is higher than the pressure in the piston conduit 18, the piston 16 moves in the downstream direction. The piston 16 travels until the pressure across the piston head equalises (or the at least one radial projection 22 on the circumferential surface of the piston 16 abuts against the downstream edge of the detent 36 in the piston sleeve 32). The apertures 20 through the piston 16 are then aligned with the one or more apertures 34 in the piston sleeve 32 and the annular fluid entrance 10 into the piston chamber 8. As such, the fluid enters into the piston 16 and passes along the conduit 18 therein and out of the exit port 14. Fluids are prevented from passing between the valve control chamber 28 and the piston chamber 18 by the piston seal 24 on the upstream end of the piston 16.

In order to assemble the valve prior to use, the first tubular portion 32a of the piston sleeve 32 is inserted through the outlet port 14 of the housing 2 into the piston chamber 8, with the recessed end of the first tubular portion 32a directed towards the outlet port 14. The piston 16 is then inserted through the outlet port 14 of the housing 2 such that the piston head enters the first tubular portion 32a of the piston sleeve 32. The seal 24 on the piston head engages the inner surface of the first tubular portion 32a and the piston 16 is continued to be urged into the first tubular portion 32a of the piston sleeve 32 until the one or more radial projection 22 on the piston 16 abuts the second end of the first tubular portion 32a of the piston sleeve 32. The second tubular portion 32b of the piston sleeve 32 is then inserted through the outlet port 14 of the housing 2, with the recessed second end portion being inserted first. The recessed portion of the second tubular portion 32b slides over the recessed portion of the first tubular portion 32a until the end of the second tubular portion 32b abuts against the shoulder that forms the transition between the thick portion and the recessed portion of the first tubular portion 32a. As the recessed portions of the two tubulars 32a, 32b only partially overlap when connected together, the resulting piston sleeve 32 has the circumferential detent 36 on the inner surface of the piston sleeve 32. A retaining ferrule 38 is then inserted into the outlet port 14 behind the second tubular portion 32b of the sleeve 32 so as to retain the piston sleeve 32 in the housing 2. The ferrule 38 and housing 2 may have cooperating screw threads such that the ferrule 38 may be screwed in place into the housing 2. The tightness of the piston sleeve 32 to the housing 2 that is required may be achieved by suitable profiles at the two ends of the sleeve 32, and mating profiles in the housing 2.

Figure 4:
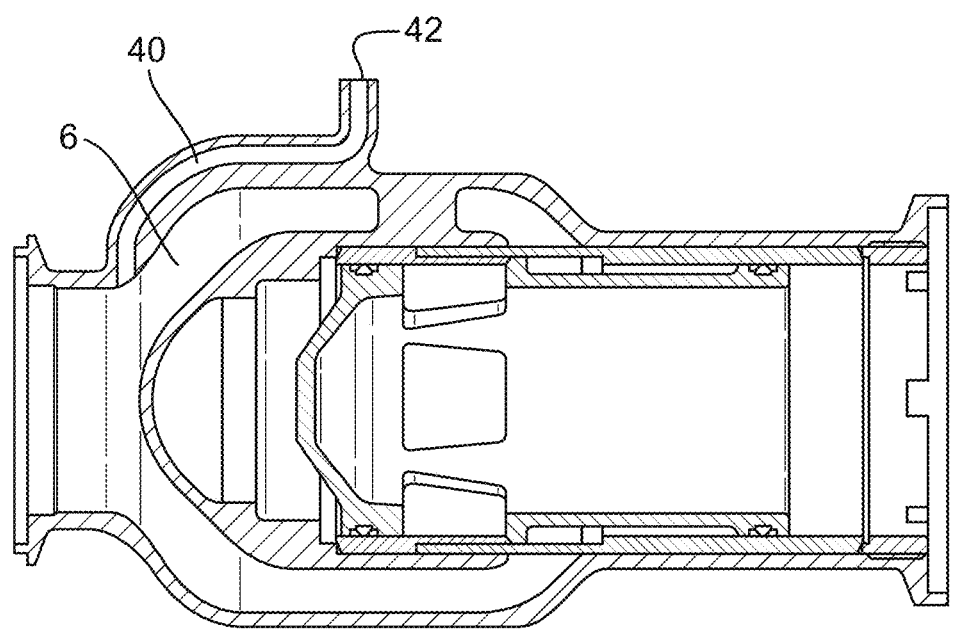
FIG. 4 shows a cross-sectional views of a valve according to a second embodiment of the present invention.

FIG. 4 shows a schematic view of another embodiment that is the same as that shown in FIGS. 2A-2B, except that the monobloc housing 2 has a further channel 40 therethrough (and the control turret 3 is not shown). This channel 40 leads from the conduit 6, through the wall of the housing 2, to a second outlet 42. This channel 40 may be used, for example, to supply pressure at the inlet port 4 to the one or more control devices attached to the control tower 3. This pressure feedback may be used by the one or more control devices to control the pressure in chamber 28 and hence the position of the piston. The provision of a channel 40 through the monobloc housing 2, enables external pipework to be eliminated, thus leading to lower parts count, lower weight, a smaller envelope, and increased reliability. It will be appreciated that additionally, or alternatively, a corresponding channel (not shown) may extend through the wall of the housing 2 to supply pressure at the outlet port 14 to the one or more control devices attached to the control tower 3. This pressure feedback may be used by the one or more control devices to control the pressure in chamber 28 and hence the position of the piston.

The use of a housing 2 and an independent piston sleeve 32 enables the geometry of the housing 2 to be optimized for its function (dictated by fluid dynamics) and for mechanical strength, since it is not required to provide the function of the piston sleeve 32. As such, the internal surface of the housing 2 (i.e. the surface of the piston cavity) need not be made to the high tolerances and have the special surface coatings required in conventional housings that act as the piston cylinder. Rather, the independent piston sleeve 32 is able to me made with the tolerances required and from a different material to the housing 2 that is more suitable for the function as a piston sleeve 32 (e.g. high hardness, low friction, etc.). Due to its simple geometry, the independent sleeve 32 will allow very accurate machining and, if required, accurate coating on its internal surface with limited costs. Also the servicing/overhauling costs of the valve will be reduced, since the piston 16 and/or piston sleeve 32 may be replaced without replacing the housing 2 (the housing not being a wear-part in the embodiments of the invention, unlike the prior art).

The valve described herein may be a valve for aerospace applications, for example, for engine/nacelle anti-icing systems, engine bleed control, etc.

As various embodiments described herein comprise a continuous single-piece housing and a separate piston sleeve, the geometry of the housing may be optimized for its intended function and mechanical strength, whilst still providing the piston with a suitable piston receiving surface. The internal surface of the housing need not be made to the high tolerances and have the special surface coatings required in conventional housings that act as the piston sleeve/cylinder, because in various embodiments the housing need not act as the piston cylinder. The independent piston sleeve of the various embodiments may be made from a different material to the housing and is able to be provided with the required tolerances, so that the sleeve has the desired properties. Also, as the sleeve may be formed independently from the housing, it may have a simple geometry and is readily accessible prior to installation in the housing. As such, the piston sleeve may be accurately machined and, if required, may be accurately coated on its internal piston-receiving surface prior to installation in the housing.

Although the present invention has been described with reference to various embodiments, it will be understood by those skilled in the art that various changes in form and detail may be made without departing from the scope of the invention as set forth in the accompanying claims.

For example, although illustrative embodiments have been described in relation to one type of valve, it will be appreciated that the present invention and teachings herein also relate to many other types of valves. For example, the valve may be a normally open valve, a normally closed valve, a regulating valve, a shut-off valve, single piston valve, a dual piston valve, etc. According to the broadest aspect of the invention, the specific type of valve is not essential. Rather, an important aspect is that the valve housing is formed from a continuous single-piece of material and that one or more independent piston sleeve is provided for one or more respective pistons.

The invention claimed is:

1. A pneumatic valve comprising:
an outer housing formed from a continuous single-piece of material and defining a fluid inlet port and a fluid outlet port;
a separate piston sleeve housed within the housing; and
a piston slidably mounted within the piston sleeve, wherein the piston comprises one or more apertures in a circumferential wall of the piston, wherein the piston sleeve and piston are geometrically configured to interact so as to limit the slidable movement of the piston within the sleeve between an open position and a closed position, wherein the sleeve comprises a radial detent extending along the sleeve and the piston comprises a radial projection that is received in the detent for limiting the slidable movement of the piston within the sleeve; and
wherein the piston sleeve is formed from first and second tubular portions that interconnect by having overlapping end portions, wherein the interconnecting end of the second tubular portion is recessed along a length thereof on its radially inner side, and wherein the recessed length only partially overlaps the first tubular portion so that said detent is formed by the end of the first tubular portion and the recessed length of the second tubular portion.

2. The valve of claim 1, wherein the housing is formed by an additive manufacturing or 3D printing technique.

3. The valve of claim 1, wherein the inner surface of the piston sleeve is a friction reducing coating or layer, or the inner surface of the piston sleeve is a lower friction material than the housing material; and/or
wherein the inner surface of the piston sleeve is a harder material than the housing material.

4. The valve of claim 1, wherein the piston sleeve and/or first tubular member and/or second tubular member and/or piston are sized and configured so as to be axially insertable into the housing through the exit port.

5. The valve of claim 4, wherein an inner surface of the housing is configured to prevent axial movement of the piston sleeve in a first direction and/or the valve comprises one or more securing members for preventing axial movement of the piston sleeve relative to the housing in a second opposite direction and out of the exit port.

6. The valve of claim 5, wherein the piston sleeve engages the housing and/or securing member with one or more mating profiles that are configured so that the one or more mating profiles ensure fluid tightness between the piston sleeve and the housing and/or securing member so as to prevent fluids, such as gases, from passing around the outside of the piston sleeve.

7. The valve of claim 1, wherein the housing formed from the continuous single-piece of material further comprises one or more conduits through a wall thereof for connecting the inlet and/or outlet port to pressure control devices and/or to other pressure fittings.

8. A method of manufacturing the valve of claim 1, comprising:
a) forming or providing said housing; b) inserting said piston into at least a portion of said piston sleeve; and then c) inserting the combination of the piston and at least a portion of said piston sleeve together into the housing through the exit port; or
d) forming or providing said housing; e) inserting at least a portion of said piston sleeve into the housing through the exit port; and then f) inserting the piston through the exit port and into the piston sleeve.

9. The method of claim 8, wherein said step of forming said housing comprises forming said housing using an additive manufacturing or 3D printing technique.

10. The method of claim 8,
wherein step b) comprises inserting one end of the piston into a first portion of the piston sleeve and another end of the piston into a second portion of the piston sleeve, and step c) comprises inserting the combination of the piston and both portions of said piston sleeve together into the housing through the exit port; or
wherein steps e) and f) comprise: inserting a first portion of the piston sleeve into the housing through the exit port; inserting the piston through the exit port and into the first portion of the piston sleeve; and inserting a second portion of the piston sleeve into the housing through the exit port so as to surround the piston.

11. The method of claim 8, comprising connecting one or more securing member to the housing to prevent axial movement of the piston sleeve relative to the housing.

12. The method of claim 8, wherein the piston sleeve engages the housing and/or a securing member with one or more mating profiles that are configured so that the one or more mating profiles ensure fluid tightness between the piston sleeve and the housing and/or securing member so as to prevent fluids, such as gases, from passing around the outside of the piston sleeve.

* * * * *